(12) United States Patent
Asano et al.

(10) Patent No.: US 9,797,474 B2
(45) Date of Patent: Oct. 24, 2017

(54) SERIES OF REDUCTION GEARS

(71) Applicant: Sumitomo Heavy Industries, Ltd., Tokyo (JP)

(72) Inventors: Kyoshi Asano, Aichi (JP); Yoshitaka Shizu, Aichi (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 105 days.

(21) Appl. No.: 14/330,782

(22) Filed: Jul. 14, 2014

(65) Prior Publication Data

US 2015/0101434 A1    Apr. 16, 2015

(30) Foreign Application Priority Data

Oct. 10, 2013  (JP) .................................. 2013-213173

(51) Int. Cl.

| F16H 57/023 | (2012.01) |
|---|---|
| F16H 1/20 | (2006.01) |
| F16H 57/029 | (2012.01) |
| F16H 57/033 | (2012.01) |
| F16H 37/08 | (2006.01) |
| F16H 1/14 | (2006.01) |

(52) U.S. Cl.
CPC ........... *F16H 1/203* (2013.01); *F16H 57/029* (2013.01); *F16H 57/033* (2013.01); *F16H 1/14* (2013.01); *F16H 37/082* (2013.01); *F16H 37/0826* (2013.01); *Y10T 74/1966* (2015.01); *Y10T 74/19674* (2015.01)

(58) Field of Classification Search
CPC ........ F16H 57/033; F16H 1/14; F16H 37/082; F16H 37/0826; Y10T 74/19674

USPC .................................................... 74/417, 7 E
See application file for complete search history.

(56) References Cited

U.S. PATENT DOCUMENTS

| 4,034,621 A | * | 7/1977 | Ritter, Jr. .................. F16H 1/14 74/417 |
| 5,950,502 A | * | 9/1999 | Genovese ............. B41F 13/008 74/417 |
| 7,370,549 B2 | * | 5/2008 | Haga ..................... F16H 57/033 74/413 |

(Continued)

FOREIGN PATENT DOCUMENTS

| JP | 4887291 B2 | 2/2012 |
| WO | WO-2006/015664 A1 | 2/2006 |

*Primary Examiner* — William Kelleher
*Assistant Examiner* — Randell J Krug
(74) *Attorney, Agent, or Firm* — Michael Best & Friedrich LLP (57) ABSTRACT

In a series of reduction gears including a parallel shaft reduction gear and an orthogonal shaft reduction gear, the parallel shaft reduction gear includes a motor, a parallel shaft reducer, and a first joint unit, and the first joint unit includes a first joint casing which is connected to a motor casing and a parallel shaft reducer casing, and a joint shaft which is connected to a motor shaft and the input shaft of the parallel shaft reducer. The orthogonal shaft reduction gear includes the motor and the parallel shaft reducer which are used in common with the parallel shaft reduction gear, a second joint unit in which a portion or all portions are used in common with the first joint unit, and an orthogonal reducer, and the motor, the second joint unit, the orthogonal reducer, and the parallel shaft reducer are connected to one another in this order.

13 Claims, 4 Drawing Sheets

(56) References Cited

U.S. PATENT DOCUMENTS

| | | | |
|---|---|---|---|
| 8,220,363 B2 | 7/2012 | Bayer et al. | |
| 8,371,186 B2* | 2/2013 | Tamura | F16H 57/022 384/585 |
| 2002/0029647 A1* | 3/2002 | Brooks | B60K 17/04 74/424 |
| 2006/0156842 A1* | 7/2006 | Melber | F16H 1/14 74/423 |
| 2006/0219037 A1* | 10/2006 | Inose | B60K 17/344 74/424 |
| 2008/0034908 A1 | 2/2008 | Bayer et al. | |
| 2010/0090418 A1* | 4/2010 | Grupido | F16J 15/064 277/637 |
| 2011/0219897 A1* | 9/2011 | Ohkawa | F16H 1/14 74/417 |
| 2012/0006135 A1* | 1/2012 | Chen | B60K 17/043 74/417 |
| 2012/0011954 A1* | 1/2012 | Adkins | B23B 45/003 74/417 |
| 2013/0220045 A1* | 8/2013 | Slayter | F16H 55/17 74/417 |
| 2014/0371028 A1* | 12/2014 | Billmeyer | F16H 1/46 475/337 |
| 2015/0020626 A1* | 1/2015 | Aoyama | F16H 1/145 74/417 |
| 2015/0128759 A1* | 5/2015 | Schnurr | F16H 57/033 74/606 R |

* cited by examiner

SERIES OF REDUCTION GEARS

INCORPORATION BY REFERENCE

Priority is claimed to Japanese Patent Application No. 2013-213173, filed Oct. 10, 2013, the entire content of which is incorporated herein by reference.

BACKGROUND

Technical Field

The present invention relates to a series of reduction gears.

Description of the Related Art

In the related art, a series of reduction gears is disclosed, in which an orthogonal reducer is configured to be positioned at a center. In the series of the reduction gears, various parallel shaft reducers are configured to be connected to a rear step of the orthogonal reducer in which an input shaft and an output shaft are disposed to be orthogonal to each other. In addition, the series of the reduction gears is designed to have a configuration in which a motor is connected to the input shaft side of the orthogonal reducer via a joint shaft or a configuration in which the parallel shaft reducer is connected to the input shaft side.

SUMMARY

According to an embodiment of the present invention, there is provided a series of reduction gears including a parallel shaft reduction gear and an orthogonal shaft reduction gear, in which the parallel shaft reduction gear includes a motor, a parallel shaft reducer in which an input shaft and an output shaft are disposed to be parallel to each other, and a first joint unit which is disposed between the motor and the parallel shaft reducer. The first joint unit includes a joint casing which is connected to a motor casing of the motor and a parallel shaft reducer casing of the parallel shaft reducer, and a joint shaft which is connected to a motor shaft of the motor and the input shaft of the parallel shaft reducer. Moreover, the orthogonal shaft reduction gear includes the motor and the parallel shaft reducer which are used in common with the parallel shaft reduction gear, a second joint unit in which a portion or all portions are used in common with the first joint unit of the parallel shaft reduction gear, and an orthogonal reducer in which an input shaft and an output shaft are disposed to be orthogonal to each other, and the motor, the second joint unit, the orthogonal reducer, and the parallel shaft reducer are connected to one another in this order.

DETAILED DESCRIPTION

According to a request of a user, as a reduction gear, an orthogonal shaft reduction gear in which an input shaft and an output shaft are disposed so as to be orthogonal to each other may be required, or a parallel shaft reduction gear in which the input shaft and the output shaft are disposed to be parallel to each other may be required.

However, in the series of the reduction gears disclosed in the related art, since the orthogonal reducer is configured so as to be positioned at the center, it is not considered that the parallel shaft reduction device, in which the input shaft and the output shaft are disposed to be parallel to each other, is configured as the entire reduction gear.

It is desirable to provide a series of reduction gears in which the orthogonal shaft reduction gear and the parallel shaft reduction gear can be configured while the parts are used in common.

According to the embodiment of the present invention, the parallel shaft reduction gear includes the motor, the parallel shaft reducer, and the first joint unit which is disposed between the motor and the parallel shaft reducer. That is, the motor, the first joint unit, and the parallel shaft reducer are connected to one another in this order.

Meanwhile, the orthogonal shaft reduction gear includes the motor and the parallel shaft reducer which are used in common with the parallel shaft reduction gear, the second joint unit in which a portion or all portions are used in common with the first joint unit of the parallel shaft reduction gear, and the orthogonal reducer, and the motor, the second joint unit, the orthogonal reducer, and the parallel shaft reducer are connected to one another in this order.

Accordingly, in the series, members including the motor, the parallel shaft reducer, and a portion or all portions of the first and second joint units are used in common, the parallel shaft reduction gear and the orthogonal shaft reduction gear can be configured.

According to the embodiment of the present invention, the series of reduction gears, in which the orthogonal shaft reduction gear and the parallel shaft reduction gear can be configured while the parts are used in common, can be obtained.

Hereinafter, a series (group) of reduction gears according to an example of an embodiment of the present invention will be described in detail with reference to the drawings.

Figure 1:
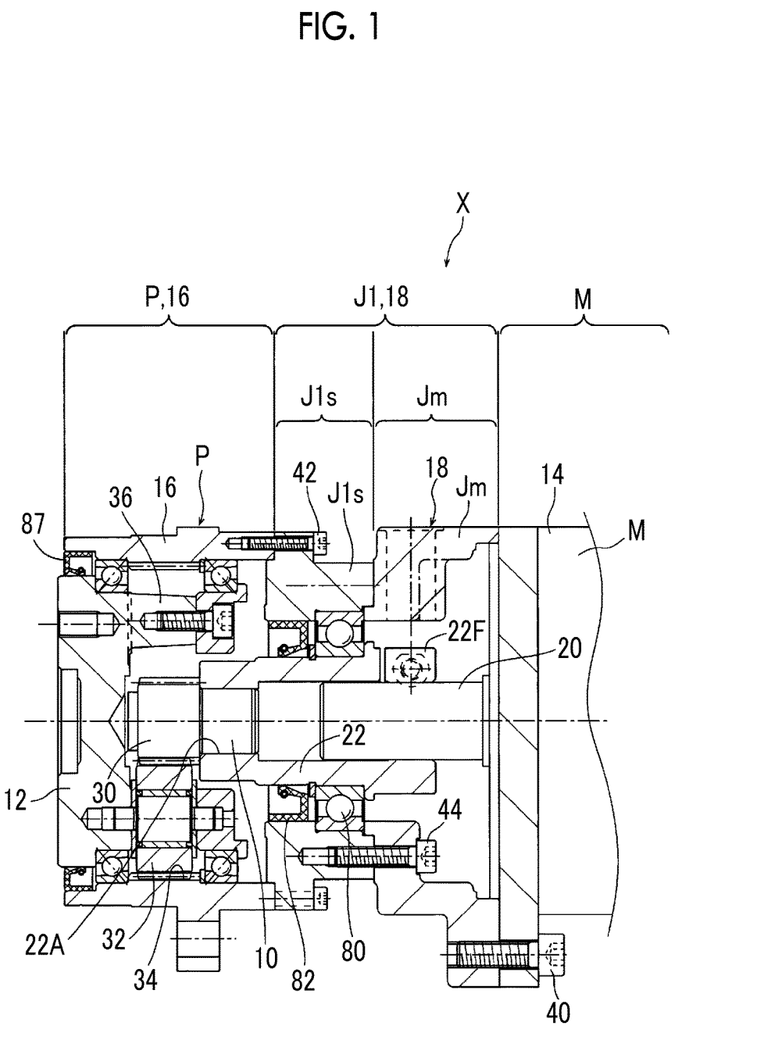
FIG. 1 is a front cross-sectional view showing a configuration example of a parallel shaft reduction gear in a series of reduction gears according to an example of an embodiment of the present invention.
Figure 2:
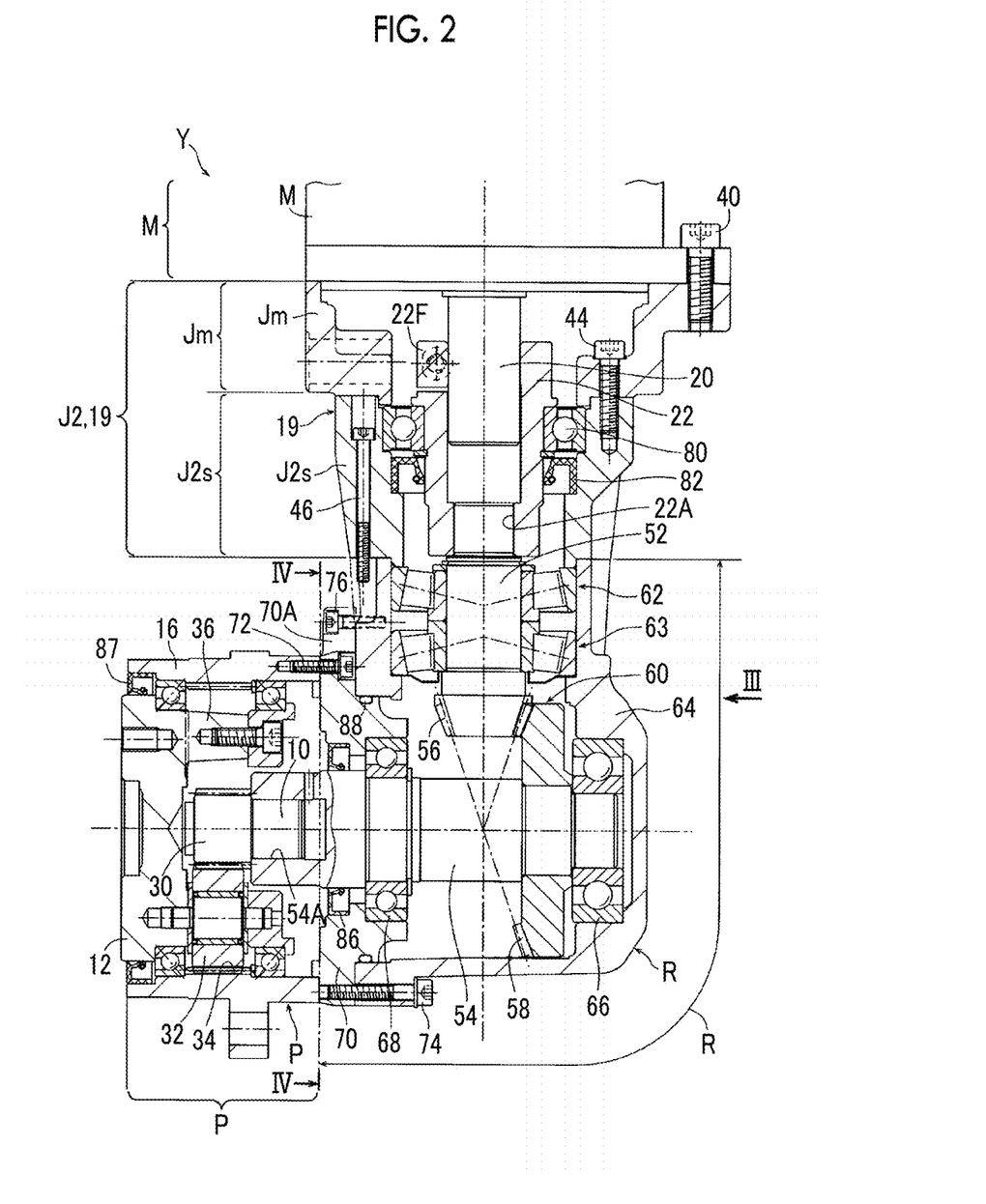
FIG. 2 is a front cross-sectional view showing a configuration example of an orthogonal shaft reduction gear in the series.

FIG. 1 shows a parallel shaft reduction gear of the series of the reduction gears according to the example of the embodiment of the present invention, and FIG. 2 shows an orthogonal shaft reduction gear of the series.

Schematically, a parallel shaft reduction gear X in the series of the reduction gears includes a motor M, a parallel shaft reducer P in which an input shaft 10 and an output shaft 12 are disposed in parallel, and a first joint unit J1 which is disposed between the motor M and the parallel shaft reducer P. The parallel shaft reduction gear X is configured so that the motor M, the first joint unit J1, and the parallel shaft reducer P are connected to one another in this order. In the parallel shaft reduction gear X, a motor shaft 20 of the motor M corresponding to the input shaft and the output shaft 12 of the parallel shaft reducer P corresponding to the output shaft are disposed in parallel.

Meanwhile, an orthogonal shaft reduction gear Y in the series of the reduction gears includes the motor M and the parallel shaft reducer P which are used in common with the parallel shaft reduction gear X, a second joint unit J2 in which a portion or all portions (a portion in this example) are used in common with the first joint unit J1 of the parallel shaft reduction gear X, and an orthogonal reducer R in which an input shaft 52 and an output shaft 54 are disposed so as to be orthogonal to each other. The orthogonal shaft reduction gear Y is configured so that the motor M, the second joint unit J2, the orthogonal reducer R, and the parallel shaft reducer P are connected to one another in this order. In the orthogonal shaft reduction gear Y, the motor shaft 20 of the motor M corresponding to the input shaft and the output shaft 12 of the parallel shaft reducer P corresponding to the output shaft are disposed so as to be orthogonal to each other.

Moreover, for convenience, in FIGS. 1 and 2, reference numerals are assigned to the motor M, the parallel shaft reducer P, the orthogonal reducer R, and the first and second joint units J1 and J2, and areas of each member which occupy the parallel shaft reduction gear X and the orthogonal shaft reduction gear Y are displayed so as to be matched to one another.

Hereinafter, more specific configurations will be described.

With reference to FIG. 1, the parallel shaft reduction gear X in the series includes the motor M, the parallel shaft reducer P, and the first joint unit J1 which is disposed between the motor M and the parallel shaft reducer P.

In this example, as the motor M which is a drive source of the parallel shaft reduction gear X, a magnet motor is used. However, for example, a three-phase induction motor may be used, and in the series, any kind of motor may be used. The motor M is used in common with the motor M of the orthogonal shaft reduction gear Y.

The parallel shaft reducer P of the parallel shaft reduction gear X is a reducer in which the input shaft 10 and the output shaft 12 are disposed in parallel, and in this example, includes a sun gear 30 which is integrally formed with the input shaft 10, a planetary gear 32 which is circumscribed to the sun gear 30, and an internal gear 34 to which the planetary gear 32 is inscribed, and is configured in a simple inline planetary gear type reducer which is output from the output shaft 12 via a carrier 36.

As is obvious from this example, "the parallel shaft reducer in which the input shaft and the output shaft are disposed in parallel", which is referred to in the series, includes not only a general parallel shaft reducer which uses a spur gear or a helical gear (the input shaft and the output shaft are not coaxial) but also a simple planetary gear type inline reducer in which the input shaft and the output shaft are disposed so as to be "coaxial", an eccentric oscillation type inline reducer in which an external gear is inscribed to an internal gear while being oscillated, or the like.

The first joint unit J1 is disposed between the motor M and the parallel shaft reducer P of the parallel shaft reduction gear X.

The first joint unit J1 includes a first joint casing 18 which is connected to a motor casing 14 of the motor M and a parallel shaft reducer casing 16 of the parallel shaft reducer P, and a joint shaft 22 which is connected to the motor shaft 20 of the motor M and the input shaft 10 of the parallel shaft reducer P.

The first joint casing 18 of the first joint unit J1 is connected to the motor casing 14 of the motor M via a first bolt 40, and is connected to the parallel shaft reducer casing 16 of the parallel shaft reducer P via a second bolt 42. The joint shaft 22 of the first joint unit J1 is connected to the motor shaft 20 of the motor M via a friction clamp device 22F (integrated with the joint shaft 22), and the joint shaft 22 is press-fitted to a hollow portion 22A to be connected to the input shaft 10 of the parallel shaft reducer P.

A portion or all portions (a portion in this example) of the first joint unit J1 are used in common with the second joint unit J2 of the orthogonal shaft reduction gear Y. More specific configurations of the first joint unit J1 and the second joint unit J2 will be described below.

Meanwhile, with reference to FIG. 2, the orthogonal shaft reduction gear Y in the series includes the motor M and the parallel shaft reducer P which are used in common with the parallel shaft reduction gear X, the second joint unit J2 in which a portion is used in common with the first joint unit J1 of the parallel shaft reduction gear X, and the orthogonal reducer R. In the orthogonal shaft reducer gear Y, the motor M, the second joint unit J2, the orthogonal reducer R, and the parallel shaft reducer P are connected to one another in this order.

The orthogonal reducer R of the orthogonal shaft reduction gear Y is a reducer in which the input shaft 52 and the output shaft 54 are disposed to be orthogonal to each other, and in this example, includes a bevel pinion 56, and a bevel gear set 60 including a bevel gear 58 press-fitted to the output shaft.

The input shaft 52 of the orthogonal reducer R is press-fitted to the hollow portion 22A of the joint shaft 22 of the second joint unit J2, and is connected to the second joint unit J2. The input shaft 52 is supported to the orthogonal reducer casing 64 via a pair of tapered roller bearings 62 and 63. The tapered roller bearings 62 and 63 have a function which can receive thrust forces in both directions applied to the input shaft 52.

The output shaft 54 of the orthogonal reducer R is supported to the orthogonal reducer casing 64 and a joint plate 70 connected to the orthogonal reducer casing 64 via bearings 66 and 68. The input shaft 10 of the parallel shaft reducer P is press-fitted to a hollow portion 54A of the output shaft 54, and thus, the output shaft 54 of the orthogonal reducer R is connected to the input shaft 10 of the parallel shaft reducer P.

Figure 3:
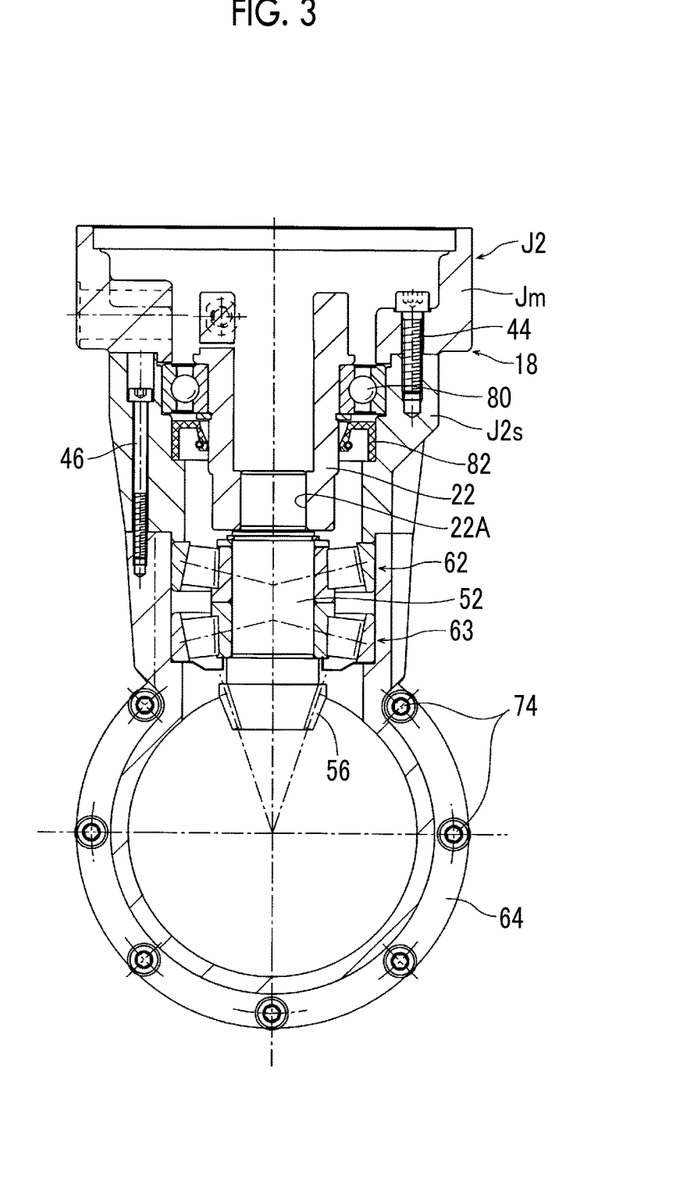
FIG. 3 is a side view in which an orthogonal reducer and a second joint unit are partially cut when viewed from an arrow III direction of FIG. 2.

The orthogonal reducer R and the parallel shaft reducer P in the orthogonal shaft reduction gear Y are connected to each other via the joint plate 70. The connection configuration will be described with reference to FIGS. 3 and 4 to be matched to each other. The joint plate 70 includes a protrusion 70A protruding in an approximately trapezoidal plate shape outside in a radial direction of the tapered roller bearings 62 and 63 supporting the input shaft 52 of the orthogonal reducer R (refer to FIG. 4). Moreover, the joint plate 70 and the parallel shaft reducer casing 16 of the parallel shaft reducer P are fixed by fifth bolts 72 (the number in the shown example is 8) which are screwed from the orthogonal reducer R side. Moreover, the orthogonal reducer casing 64 of the orthogonal reducer R and the joint plate 70 are fixed by sixth bolts 74 (the number in the shown example is 7) which are screwed from the orthogonal reducer R side, and are fixed by seventh bolts 76 (the number in the shown example is 2) which are screwed from the side (from the parallel shaft reducer P side) opposite to the orthogonal reducer side in the protrusion 70A.

Specifically, in this example, the orthogonal reducer casing 64 of the orthogonal reducer R and the joint plate 70 are fixed by the sixth bolts 74 which are screwed from the orthogonal reducer R side. However, one (the sixth bolt to be disposed at a portion indicated by a reference numeral 74A in FIG. 4) of the sixth bolts 74 interferes with the tapered roller bearings 62 and 63 which support the input shaft 52 of the orthogonal reducer R, and thus, cannot be disposed. However, this portion is an important portion in which the orthogonal reducer casing 64 and the parallel shaft reducer casing 16 perpendicularly contact each other via the joint plate 70. Accordingly, the protrusion 70A is formed on the joint plate 70, two seventh bolts 76 (instead of the sixth bolt at the portion indicated by the reference numeral 74A) are disposed on the protrusion 70A, and thus, high connection strength is maintained.

Here, the first joint unit J1 of the parallel shaft reduction gear X, the second joint unit J2 of the orthogonal shaft reduction gear Y, and configurations in the vicinity of the units will be described. As described above, a portion or all portions (a portion in this example) of the first joint unit J1 and the second joint unit J2 are used in common with each other.

The first joint casing 18 of the first joint unit J1 of the parallel shaft reduction gear X includes a main joint casing Jm which is connected to the motor casing 14 via the first bolts 40, and a first sub joint casing J1s which is connected to the parallel shaft reducer casing 16 via the second bolts 42. Moreover, the main joint casing Jm and the first sub joint casing J1s are connected to each other via third bolts 44.

The second joint casing 19 of the second joint unit J2 of the orthogonal shaft reduction gear Y includes the main joint casing Jm (used in common with the first joint unit J1) which is connected to the motor casing 14 via first bolts 40, and a second sub joint casing J2s (not used in common with the first sub joint casing J1s of the first joint unit J1) which is connected to the orthogonal reducer casing 64 via fourth bolts 46. In addition, the main joint casing Jm and the second sub joint casing J2s are connected to each other via third bolts 44 which are used in common with the first joint unit J1.

That is, each of the first joint J1 and the second joint J2 is configured of the main joint casing Jm which is used in common, and the first and second sub joint casing J1s and J2s which are not used in common.

Moreover, the joint shaft 22 is common in the first joint unit J1 and the second joint unit J2. The joint shaft 22 is supported by a common bearing 80. The bearing 80 is configured of a ball bearing and a bearing which cannot receive the thrust force of the orthogonal reducer R singly. In this example, in consideration of easy machining or the like, the bearing 80 is disposed at the first and second sub joint casings J1s and J2s being relatively small in size (not applied to the main joint casing Jm). Moreover, since the main joint casing Jm is different according to a kind of the motor but the first and second sub joint casings J1s and J2s are common regardless of the kind of the motor, the first and second sub joint casings J1s and J2s are easily machined in the total series, and thus, the casings J1s and J2s are relatively small in size.

Moreover, an oil seal 82 sealing the motor M side and the parallel shaft reducer P side is disposed in the first joint unit J1, and the oil seal 82 is used in common as an oil seal sealing the motor M side and the orthogonal reducer R side in the second joint unit J2. In this example, the oil seal 82 is also disposed in the first and second sub joint casings J1s and J2s.

Moreover, reference numerals 86 and 87 indicate oil seals, and a reference numeral 88 indicates an O ring.

Hereinafter, effects of the series of the reduction gears will be described.

In the series, the parallel shaft reduction gear X includes the motor M, the parallel shaft reducer P, and the first joint unit J1 which is disposed between the motor M and the parallel shaft reducer P, and the orthogonal shaft reduction gear Y includes the motor M and the parallel shaft reducer P which are used in common with the parallel shaft reduction gear X, the second joint unit J2 in which a portion is used in common with the first joint unit J1 of the parallel shaft reduction gear X, and the orthogonal reducer R.

Accordingly, in the series, many members are used in common and can configure both the parallel shaft reduction gear X and the orthogonal shaft reduction gear Y. More specifically, in the series, in the parallel shaft reduction gear X and the orthogonal shaft reduction gear Y, in addition to the motor M and the parallel shaft reducer P, the joint shaft 22 of the first and second joint unit J1 and J2, the bearing 80 of the joint shaft 22, the main joint casing Jm, and the oil seal 82 on the joint shaft 22 are used in common. Moreover, the first bolts 40 connecting the motor casing 14 and the main joint casing Jm of the first and second joint units J1 and J2, and third bolts 44 connecting the main joint casing Jm and the first and second sub joint casings J1s and J2s are also used in common in the parallel shaft reduction gear X and the orthogonal shaft reduction gear Y.

Particularly, the motor M and the parallel shaft reducer P which are members that are large in size are used in common, and also in the first and second joint units J1 and J2, the main joint casing Jm connected to the joint shaft 22 or the motor casing 14 is used in common, only the first and second sub joint casings J1s and J2s connected to the parallel shaft reducer P or the orthogonal reducer R are not used in common, and thus, great advantages are obtained.

Accordingly, two kinds of the first and second joint units J1 and J2 themselves (in their entirety) are not needed to prepare for connecting the parallel shaft reducer and connecting the orthogonal reducer, only minimum required portions are not used in common, and thus, the first and second joint units J1 and J2 can be formed at a lower cost.

Moreover, in this example, the bearing 80 of the joint shaft 22 of the first and second joint units J1 and J2 is a ball bearing, and is a bearing which cannot receive the thrust force of the orthogonal reducer R singly. In addition, the thrust force of the input shaft 52 of the orthogonal reducer R can be received by the pair of tapered roller bearings 62 and 63 which is disposed in the orthogonal reducer R itself and can receive the thrust forces in both directions of the input shaft 52. Accordingly, the first and second joint units J1 and J2 can be formed at a low cost, and thus, in the series, particularly a low cost property can be maintained when the parallel shaft reduction gear X is configured while the orthogonal shaft reduction gear Y can be configured.

Moreover, the parallel shaft reduction gear X (parallel shaft reducer P) of the series is a simple inline planetary gear type parallel shaft reduction gear in which the input shaft 10 and the output shaft 12 are disposed to be coaxial. Accordingly, when the parallel shaft reducer is changed to other inline types (for example, a type such as an eccentric oscillation type reducer), a design which matches connections between the input shaft and the casing can be easily realized, and advantages such as expansion of variation or high exchangeability of the parallel shaft reducer can also be obtained. As described above, in brief, in the parallel shaft reducer of the parallel shaft reduction gear of the series according to the present invention, the input shaft and the output shaft may be disposed to be parallel to each other, and are not necessarily set to a line type. Accordingly, in addition to a planetary gear type reducer, a parallel shaft reducer using a spur gear or a helical gear may be adopted.

Figure 4:
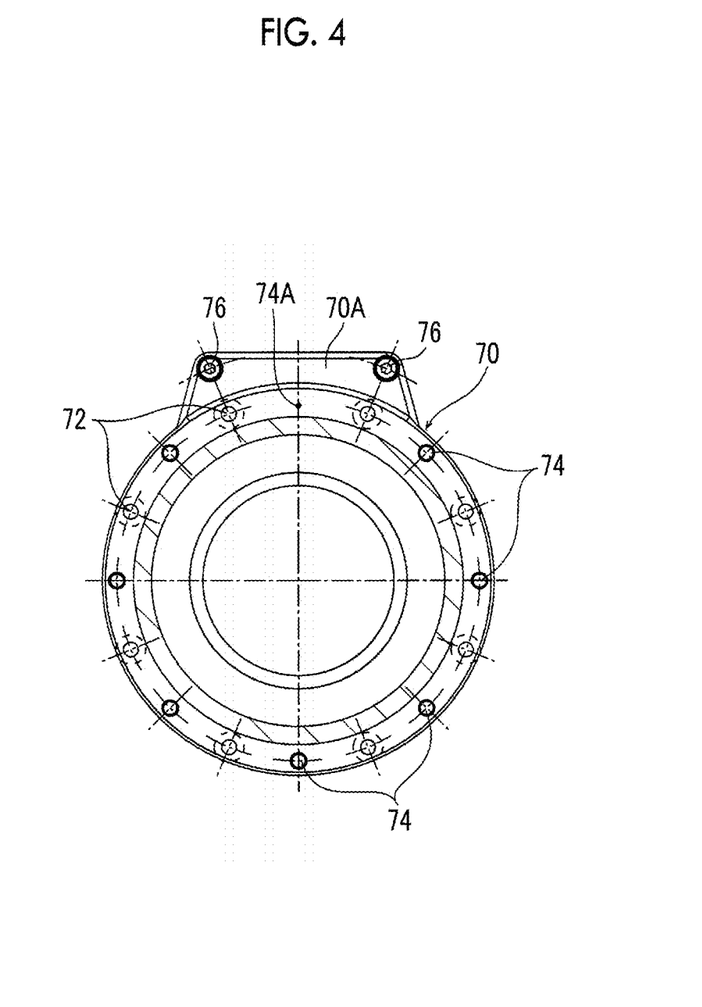
FIG. 4 is a cross-sectional view taken along arrow IV-IV line of FIG. 2.

In addition, in the series, the orthogonal reducer R and the parallel shaft reducer P are connected to each other via the joint plate 70, the joint plate 70 includes the protrusion 70A protruding outside the tapered roller bearings 62 and 63 supporting the input shaft 52 of the orthogonal reducer R, and thus, in addition to the vicinities of the tapered roller bearings 62 and 63, the connection between the orthogonal reducer R and the parallel shaft reducer P can be more securely performed.

Moreover, in the series according to the embodiment, the orthogonal reducer R of the orthogonal shaft reduction gear Y includes the bevel gear set 60 configured of the bevel pinion 56 and the bevel gear 58. However, the orthogonal reducer R of the orthogonal shaft reduction gear Y of the series according to the present invention is not limited to the reducer having the configuration. That is, in brief, as long as the input shaft and the output shaft are disposed to be orthogonal to each other, for example, an orthogonal reducer including a hypoid gear set configured of a hypoid pinion and a hypoid gear, a worm gear set configured of a worm and a worm wheel, or the like may be adopted. Moreover, the orthogonal reducer is not necessarily "decelerated", and only the rotation direction may be changed in a state where the orthogonal reducer is maintained at a constant velocity. That is, here, the orthogonal reducer includes an orthogonal reducer in which a reduction ratio is 1. When the reduction ratio of the orthogonal reducer is 1, a total reduction ratio of the orthogonal shaft reduction gear coincides with the reduction ratio of the parallel shaft reducer.

Moreover, in the series, the bearings 80 and the oil seals 82 of the joint shafts 22 of the first and second joint units J1 and J2 are disposed in the first and second sub joint casings J1s and J2s. However, the disposition of the bearings and the disposition of the oil seals of the joint shafts are not limited to this. For example, the bearings and the oil seals may be disposed on the main joint casing side. In the example, the number of the bearings is 1. However, the number may be 2. When two bearings of the joint shaft are disposed, both may be disposed on the first and second sub joint casing, both may be disposed on the main joint casing, or each one may be disposed extending over the main joint casing and the first and second sub joint casings. Moreover, the kind of the bearing of the joint shaft is also not limited to a ball bearing, and for example, may be a roller bearing. In addition, in the example, the bearing of the joint shaft is a bearing which cannot receive the thrust force of the orthogonal reducer singly. However, a bearing which can receive the thrust force may be configured, and for example, a bearing which can receive the thrust force of the orthogonal reducer singly may be used.

In addition, in the series, in the first and second joint units, a portion is used in common with each other. However, according to research of the orthogonal reducer casing, in the first and second joint units, all portions may be used in common with each other. In this case, a low cost can be further improved.

Moreover, in the series, in the orthogonal shaft reduction gear Y, the parallel shaft reducer P is connected to the rear step of the orthogonal reducer R. However, like the present embodiment, when the parallel shaft reducer P side of the orthogonal reducer R is completely sealed by the oil seal 86 and the O ring 88, according to the usage, the parallel shaft reducer P positioned at the final step in the orthogonal shaft reduction gear Y may not necessarily be connected. That is, in the base of the configuration example, the orthogonal shaft reduction gear Y is completed by the connection of the motor M, the second joint unit J2, and the orthogonal reducer R, and a driven shaft of a mating machine or the like may be directly connected to the output shaft 54 of the orthogonal reducer R.

It should be understood that the invention is not limited to the above-described embodiment, but may be modified into various forms on the basis of the spirit of the invention. Additionally, the modifications are included in the scope of the invention.

What is claimed is:

1. A gear assembly comprising:
   a parallel shaft reduction gear, an orthogonal shaft reduction gear, a first joint unit configured to connect a drive motor to the parallel shaft reduction gear, a second joint unit configured to connect the drive motor to the orthogonal shaft reduction gear, and a joint plate configured to connect the parallel shaft reduction gear to the orthogonal shaft reduction gear,
   wherein the orthogonal shaft reduction gear includes an orthogonal shaft reduction gear casing, an orthogonal shaft reduction gear input shaft having an orthogonal pinion, and an orthogonal shaft reduction gear bearing disposed between the orthogonal shaft reduction gear casing and the orthogonal shaft reduction gear input shaft,
   wherein the first joint unit includes:
   a first joint casing including a first main casing configured to be secured to a motor casing, the first joint casing configured to be connected to the parallel shaft reduction gear;
   a first bearing coupled to the first joint casing; and
   a first joint shaft supported by the first bearing for rotation relative to the first joint casing, the first joint shaft including a first end and a second end, the first end of the first joint shaft configured to be coupled for rotation with an output shaft of the drive motor, the second end configured to be coupled for rotation with an input shaft of the parallel shaft reduction gear;
   wherein the second joint unit includes:
   a second joint casing including a second main casing configured to be secured to the motor casing and having the same size and shape as that of the first main casing, the second main casing being a separate member from the first main casing, the second joint casing configured to be connected to the orthogonal shaft reduction gear;
   a second bearing coupled to the second joint casing and having the same size and shape as that of the first bearing, the second bearing being a separate member from the first bearing; and
   a second joint shaft supported by the second bearing for rotation relative to the second joint casing and having the same size and shape as that of the first joint shaft, the second joint shaft being a separate member from the first joint shaft, the second joint shaft including a first end and a second end, the first end of the second joint shaft configured to be coupled for rotation with an output shaft of the drive motor and the second end of the second joint shaft configured to be coupled for rotation with an input shaft of the orthogonal shaft reduction gear, and
   wherein the second joint casing is a separate member from the orthogonal shaft reduction gear casing and the second bearing is a bearing different from the orthogonal shaft reduction gear bearing.

2. The gear assembly of claim 1, wherein the first joint unit includes a first seal disposed between the first joint casing and the first joint shaft, and
   the second joint unit includes a second seal disposed between the second joint casing and the second joint shaft and having the same size and shape as that of the first seal, the second seal being a separate member from the first seal.

3. The gear assembly of claim 1, wherein the orthogonal shaft reduction gear includes an orthogonal shaft reduction gear output shaft and a pair of bearing supporting the orthogonal shaft reduction gear output shaft, and
one of the pair of bearings is disposed in the orthogonal shaft reduction gear casing and the other of the pair of bearings is disposed in the joint plate.

4. The gear assembly of claim 1, wherein the first joint casing includes a first sub casing that is configured to be secured to a reducer casing of the parallel shaft reduction gear,
the second joint casing includes a second sub casing that is configured to be secured to a reducer casing of the orthogonal shaft reduction gear, and
the first sub casing has a different size and shape from that of the second sub casing.

5. The gear assembly of claim 4, wherein
the first bearing is supported in the first sub casing and
the second bearing is supported in the second sub casing.

6. The gear assembly of claim 4, wherein the first joint unit includes a first seal disposed between the first sub casing and the first joint shaft, and
the second joint unit includes a second seal disposed between the second sub casing and the second joint shaft and having the same size and shape as that of the first seal, the second seal being a separate member from the first seal.

7. The gear drive assembly of claim 1, wherein the first joint unit includes a first bearing supporting the first joint shaft for rotation, and the second joint unit includes a second bearing supporting the second joint shaft for rotation and having the same size and shape as that of the first bearing, the second bearing being a separate member from the first bearing.

8. The gear drive assembly of claim 7, wherein the first bearing is disposed in the first sub casing and the second bearing is disposed in the second sub casing, and
the first sub casing has a different size and shape from that of the second sub casing.

9. A gear drive assembly comprising:
a drive motor including a motor casing and a motor output shaft;
a parallel shaft reduction gear; an orthogonal shaft reduction gear; a first joint unit configured to connect the drive motor to the parallel shaft reduction gear; and a second joint unit configured to connect the driver motor to the orthogonal shaft reduction gear,
wherein the orthogonal shaft reduction gear includes an orthogonal shaft reduction gear casing, an orthogonal shaft reduction gear input shaft having an orthogonal pinion, and an orthogonal shaft reduction gear bearing disposed between the orthogonal shaft reduction gear casing and the orthogonal shaft reduction gear input shaft,
wherein the first joint unit includes
a first joint casing including a first main casing configured to be secured to the motor casing and a first sub casing configured to be secured to a reducer casing of the parallel shaft reduction gear; and a first joint shaft supported for rotation relative to the first joint casing, the first joint shaft including a first end and a second end, the first end coupled to the motor output shaft for rotation with the motor output shaft, the second end coupled to an input shaft of the parallel shaft reduction gear for rotation with the input shaft,
wherein the second joint unit includes
a second joint casing including a second main casing configured to be secured to the motor casing and having the same size and shape as that of the first main casing and a second sub casing configured to be secured to a reducer casing of the orthogonal shaft reduction gear, the second main casing being a separate member from the first main casing; and
a second joint shaft supported for rotation relative to the second joint casing and having the same size and shape as that of the first joint shaft the second joint shaft being a separate member from the first joint shaft the second joint shaft including a first end coupled to the motor output shaft for rotation with the motor output shaft and a second end coupled to an input shaft of the orthogonal shaft reduction gear for rotation with the input shaft, and
wherein the second joint casing is a separate member from the orthogonal shaft reduction gear casing.

10. The gear drive assembly of claim 9, wherein, the reducer casing of the orthogonal shaft reduction gear has a joint plate, and
wherein the parallel shaft reduction gear is directly coupled to the joint plate.

11. The gear drive assembly of claim 10, wherein the joint plate includes a protrusion which protrudes outside of a bearing assembly supporting the input shaft of the orthogonal shaft reduction gear,
wherein the joint plate and the parallel shaft reduction gear are secured by a plurality of first bolts threaded through the joint plate and into the reducer casing of the parallel shaft reduction gear, and
wherein the joint plate is secured to the reducer casing of the orthogonal shaft reduction gear by a plurality of second bolts threaded through the joint plate and into the reducer casing.

12. The gear drive assembly of claim 9, wherein the first joint unit includes a first oil seal sealing at least the first main casing of the first joint casing and a second oil seal sealing at least the second main casing of the second joint casing and having the same size and shape as that of the first oil seal, the second oil seal being a separate member from the first oil seal.

13. The gear drive assembly of claim 12, wherein the first oil seal is disposed in the first sub casing and the second oil seal is disposed in the second sub casing.

* * * * *